United States Patent [19]

Inohara et al.

[11] 4,449,148
[45] May 15, 1984

[54] IMAGE DISPLAY APPARATUS

[75] Inventors: Shizuo Inohara, Toyonaka; Mitsuya Masuda, Kyoto; Sadahiro Iyehara, Suita; Minoru Ueda, Takatsuki; Keisuke Yamamoto, Ibaraki, all of Japan

[73] Assignee: Matsushita Electric Industrial Co., Ltd., Kadoma, Japan

[21] Appl. No.: 343,756

[22] Filed: Jan. 28, 1982

[30] Foreign Application Priority Data

Feb. 10, 1981 [JP] Japan .................................. 56-18783
Feb. 18, 1981 [JP] Japan .................................. 56-22729

[51] Int. Cl.³ .......................... H04N 5/66; H04N 9/12; H04J 31/20
[52] U.S. Cl. ...................................... 358/230; 358/56; 315/366; 313/422
[58] Field of Search ............... 358/230, 231, 241, 242, 358/56, 59, 64, 65, 66, 67, 68; 340/772; 313/409, 411, 413, 414, 422, 497; 315/13 R, 366, 169 TV, 169 R

[56] References Cited

U.S. PATENT DOCUMENTS

3,800,186  3/1974  Yamane ................................ 340/772
3,992,644  11/1976 Chodil .................................. 358/56
4,158,210  6/1979  Watanabe ............................. 358/56
4,170,771  10/1979 Bly ...................................... 358/241
4,170,772  10/1979 Bly ...................................... 358/59

Primary Examiner—Tommy P. Chin
Attorney, Agent, or Firm—Cushman, Darby & Cushman

[57] ABSTRACT

A flat type display apparatus includes an electron beam source for emitting a row of a large number of electron beams, and a phosphor screen having a phosphor layer which emits light in response to impingement by the electron beams. An electron beam convergence means is provided and an electrostatic deflection means for deflecting the electron beams prior to impingement on the phosphor screen. An electron beam controlling means has a number of electron beam controlling electrodes for individually controlling the current of the electron beams to control light emissions from the phosphor screen. A pulse width modulation circuit feeds electron control signals of a constant voltage and pulse-width modulated by video signal information to be displayed. Light emission control without changing converging conditions of electrostatic lenses is thus obtained so that a good linearity between the video signals and the electron beams is obtained.

8 Claims, 15 Drawing Figures

IMAGE DISPLAY APPARATUS

BACKGROUND OF THE INVENTION

1. Field of the Invention

The present invention relates to a video image display apparatus comprising a flat displaying apparatus with a number of (for example fifteen) line cathodes.

More particularly, the present invention concerns a video image display apparatus for displaying a video image by means of a phosphor screen and a plural number of parallel disposed line cathodes.

2. Description of the Prior Art

Hitherto, for a video image display apparatus for a television set, a cathode-ray tube having at least one electron gun or a single electron gun set in a neck part of a bulky cone shaped vacuum enclosure has been used for a long time. The shortcoming of the conventional cathode ray tube is a large depth in comparison with the size of the screen face, disabling to provide a flat and compact television set. Though EL display apparatus, plasma display apparatus or liquid crystal display apparatus have been developed, these are not sufficiently usable for practical use because they have problems in brightness and, contrast.

SUMMARY OF THE INVENTION

Therefore, the present invention is intended to provide a television set with a flat shaped display apparatus.

The present invention enables to display video images of a high quality without unevenness of brightness or color.

The image display apparatus in accordance with the present invention comprises:

an electron beam source for emitting at least an electron beam, a phosphor screen having a phosphor layer which emits light at impingement by the electron beam, an electron beam convergence means, an electrostatic deflection means for deflecting the electron beam prior to impingement on the phosphor screen, an electron beam controlling means for controlling intensity of the electron beam thereby to control light emission from the phosphor screen, characterized in that said electron beam control means receives a control signal which is pulse width modulated by video signal information to be displayed.

The apparatus in accordance with the present invention can display various brightness responding to the change of video signal without changing size of the spot.

In the apparatus in accordance with the present invention, white balance of the display can be adjusted without changing spot size on the phosphor screen. This can be made by changing the proportion or ratio of time of electron beam impingement on the phosphor among three primary colors.

Operating circuit is constructed so as to obtain satisfactory displaying of video images, and the construction is explained in detail referring to the accompanying drawings.

DESCRIPTION OF THE PREFERRED EMBODIMENTS

Figure 1:
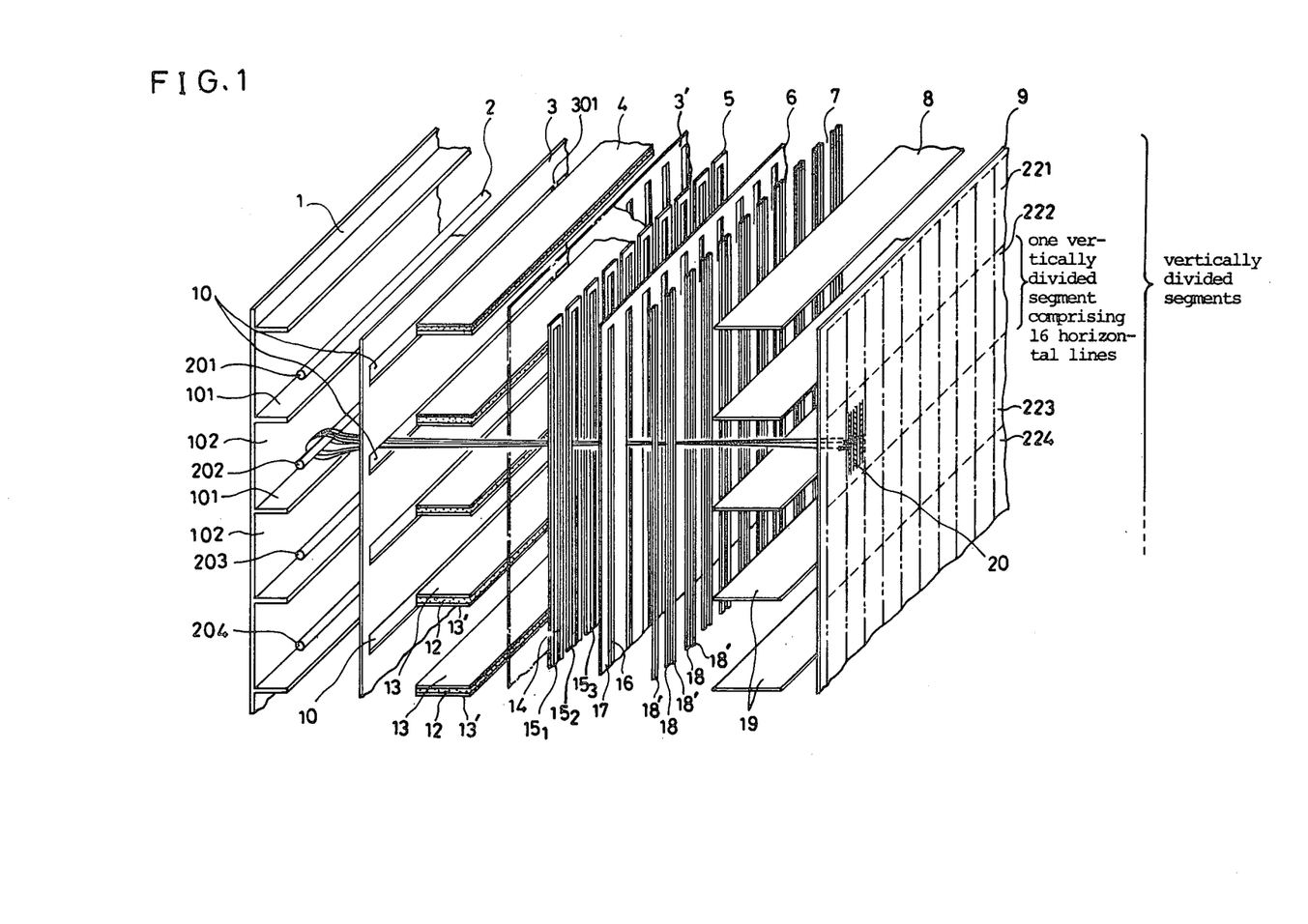
FIG. 1 is an exploded perspective view of a principal part, with its vacuum enclosure removed, of a video image display apparatus for embodying the present invention, expanded with its size in the horizontal direction enlarged in comparison with the vertical direction for easier drawing of minute constructions.

One preferred example of the present invention is shown in FIG. 1, wherein from the back part to front part the following components are provided in a flat box shaped evacuated envelope not shown here, but preferably made of glass:

a back electrode 1 having horizontal isolation walls 101, 101 ... projecting perpendicularly therefrom forming isolated spaces 102, 102 ... therein, a row of a predetermined number (e.g. 15 in this embodiment) of horizontal line cathodes 201, 202, ... disposed substantially horizontally in the isolated spaces 102, 102 ... , a vertical beam-focussing electrode 3 having the predetermined number (e.g. 15 in this embodiment) of horizontal slits 10, a first vertical deflection means 4 comprising the predetermined number of pair of vertical deflection electrodes 13', 13 ... , held by insulator board 12. Each pair of vertical deflection electrodes comprises an upper electrode 13 and a lower electrode 13' both disposed substantially horizontally and defining a deflection space inbetween disposed before the corresponding horizontal slit 10, a second vertical beam-focussing electrode 3' substantially similar to the horizontal beam-focussing electrode 6, a predetermined large number (e.g. 320 for this embodiment) of beam control electrodes 5 consisting of vertical strip electrodes $15_1, 15_2 \ldots 15_{320}$ each having beam-passing slits 14, 14 ... disposed with uniform pitch, a horizontal beam-focussing electrode 6 having the predetermined number (e.g. 320 for this embodiment) of vertical slits at positions in front of the slits 14, 14, ... of the beam control electrodes 5, 5 ... , a horizontal deflection means 7 comprising the predetermined number (e.g. 320 for this example) of vertical strip electrodes 18, 18', 18, 18' ... defining the predetermined number (e.g. 320 for this example) of vertically oblong deflection gaps inbetween, a beam acceleration means 8 consisting of a set of horizontally disposed electrodes 19, 19 . . . , and finally a phosphor screen 9, which is ordinarily provided on the inner wall of a front face of the enclosure.

The line cathodes 201, 202 . . . form electron beam source 2, wherein horizontal line cathodes are disposed forming a vertical row, with substantially uniform gaps with each other. In this example, as abovementioned, 15 line cathodes 201, 202 . . . 215 are provided, but only four of them are shown. The line cathodes are made by coating a tungsten wire of, for example, 10–20 $\mu m$ diameter with known electron emitting cathode oxide. All the line cathodes are heated by feeding current thereto, and selective in-turn taking out of horizontal sheet shaped electron beam from selected one of the line cathode is done by changing a potential of the in-turn selected line cathode to negative with respect to the potential of the focussing electrode 3.

The back electrode 1 serves to suppress emissions of electrons from other line cathodes than the selected one and also expels the electrons from the selected cathode to its front direction. The back electrode 1 may be formed by attaching conductive substance such as conductive paint on the inner wall of the back face of the flat type vacuum enclosure. A flat plane shaped cathode may be used in place of the row of the line electrode 201, 202 . . . .

The first vertical beam-focussing electrode 3 have the slits 10 at the position to face the line cathodes 201, 202 . . . and is impressed with a DC voltage, therefore horizontal sheet shaped electron beam from a selected line cathode is formed. The sheet shaped electron beam is then divided into a large number (e.g. 320 in this example) of narrow electron beams by passing through the second vertical beam-focussing electrode 3', the control electrode 5 and horizontal focussing electrode 6. In FIG. 1, only one such narrow electron beam is shown for simplicity. Each slit 10 may have supporting ribs in midway part of the length, or further may consist of a large number (e.g. 320) of openings with very narrow rib parts 301 inbetween.

The electrodes 13, 13' of the vertical deflection means 4 are disposed at levels of substantially the centers between vertically neighboring two horizontal slits 10, 10 of the vertical focussing electrode 3, and a lower electrode 13 and an upper electrode 13' are held on both faces (upper and lower faces) of an insulation board 12. A changing voltage (a vertical deflection signal) is impressed across the pair of upper electrode and lower electrode of each pair thereby forming changing electric field for vertical deflection. In this example, as has been elucidated, by impressing the 16-step changing voltage across the pair electrodes, each electron beam is deflected in a manner to have 16 levels. And the same matter takes place in each of 15 vertically divided segments 221, 222, 223 . . . 235 on the phosphor screen. Accordingly, the phosphor screen 9 has 240 horizontal lines in total (16 lines×15 segments=240 lines).

The beam control electrodes 5 comprising 320 strip electrodes $15_1, 15_2 \ldots 15_{320}$ together with the horizontal beam focussing electrode 6 divide the horizontal sheet shaped electron beam into 320 rod shaped electron beams, and each strip electrodes $15_1, 15_2 \ldots 15_{320}$ of the beam control electrodes 5 control intensities of the rod shaped electron beams responding to the information of the video signal. Therefore, the 320 strip electrodes control information of 320 picture elements on each horizontal line. The 320 beam control electrodes receive 320 control signals respectively and controls the 320 rod beams in such a manner as, at one time for red color irradiation, at one time for green color irradiation and at one time for blue color irradiation, in turn. In order to display color picture on the color phosphor screen with the control signals applied to the beam control electrodes, each picture element comprises three elementary color regions, namely red strip region, green strip region and blue strip region, which are disposed in the horizontal direction.

The feature of the present embodiment is that all the 320 beam control electrodes $15_1, 15_2 \ldots 15_{320}$ receive the beam control signal for displaying one of three primary colors, i.e., red, green or blue, at the same time. That is, at one moment, all parts of one horizontal line on the phosphor screen displays an image of red color part of the line, at the next moment an image of green color part of the line and at the next moment an image of blue color part of the line.

The horizontal beam-convergence electrode 6 is impressed with a DC voltage and converges the rod shaped electron beams in the horizontal direction.

Figure 4:
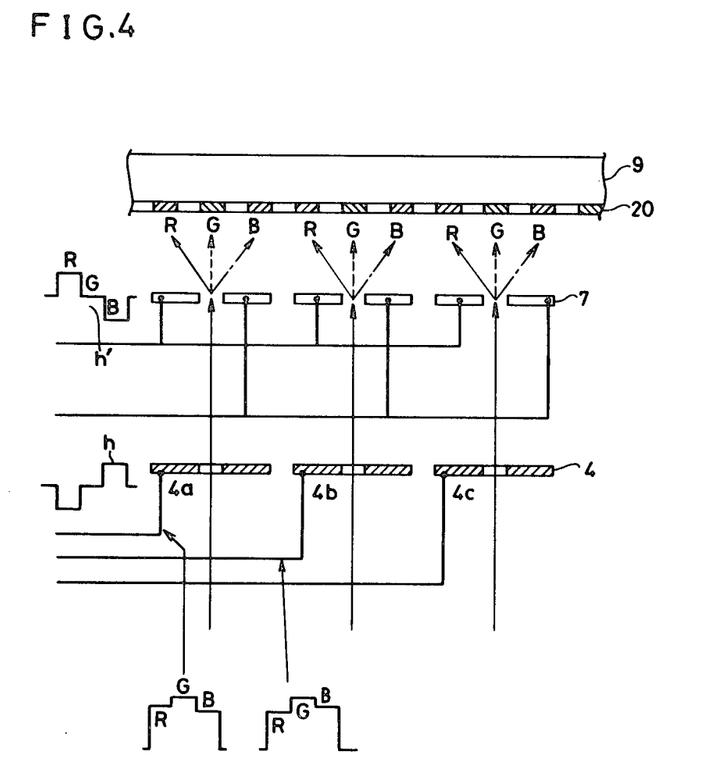
FIG. 4 is a schematic sectional plan view illustrating horizontal deflection of the example of FIG. 3.

The horizontal deflection means 7 comprises 320 parts of twin pair strip electrodes 18, 18', that is 640 strip electrodes in total, each of which is disposed at the position in front of center position between neighboring slits 16, 16 of the horizontal beam focussing electrode 6. Across each of the twin pair strip electrodes 18, 18', 3-level changing voltage or a horizontal deflection signal is impressed, so that the 320 electric fields formed by the twin pair strip electrodes uniformly deflect 320 rod-shaped electron beams in the horizontal direction, thereby making the rod shaped electron beam selectively impinge red phosphor regions, green phosphor regions and blue phosphor regions in turn as in FIG. 4.

In the example, where a horizontal row of 320 rod shaped electron beams impinge 320 sets of three primary color regions, one horizontal deflection range corresponds to one horizontal picture element width.

The horizontally disposed electrodes of the beam-acceleration means 8 are disposed at the height level corresponding to those of the composite body of vertical deflection electrodes 13 and 13' and are impressed with a DC voltage.

The phosphor screen 9 may be provided with a known metal back layer (not shown) formed on the side of cathodes and a positive DC voltage is impressed thereon. In practical example, the phosphor regions are formed as vertically oblong strips of red color phosphor, green color phosphor and blue color phosphor. In FIG. 1, horizontal broken lines on the phosphor screen 9 show boundary lines between neighboring vertically divided segments to be impinged by electron beams of respective line cathodes. Vertical chain lines on the phosphor screen 9 show boundary lines between horizontally neighboring sets of three primary color phosphor strips.

Figure 2:
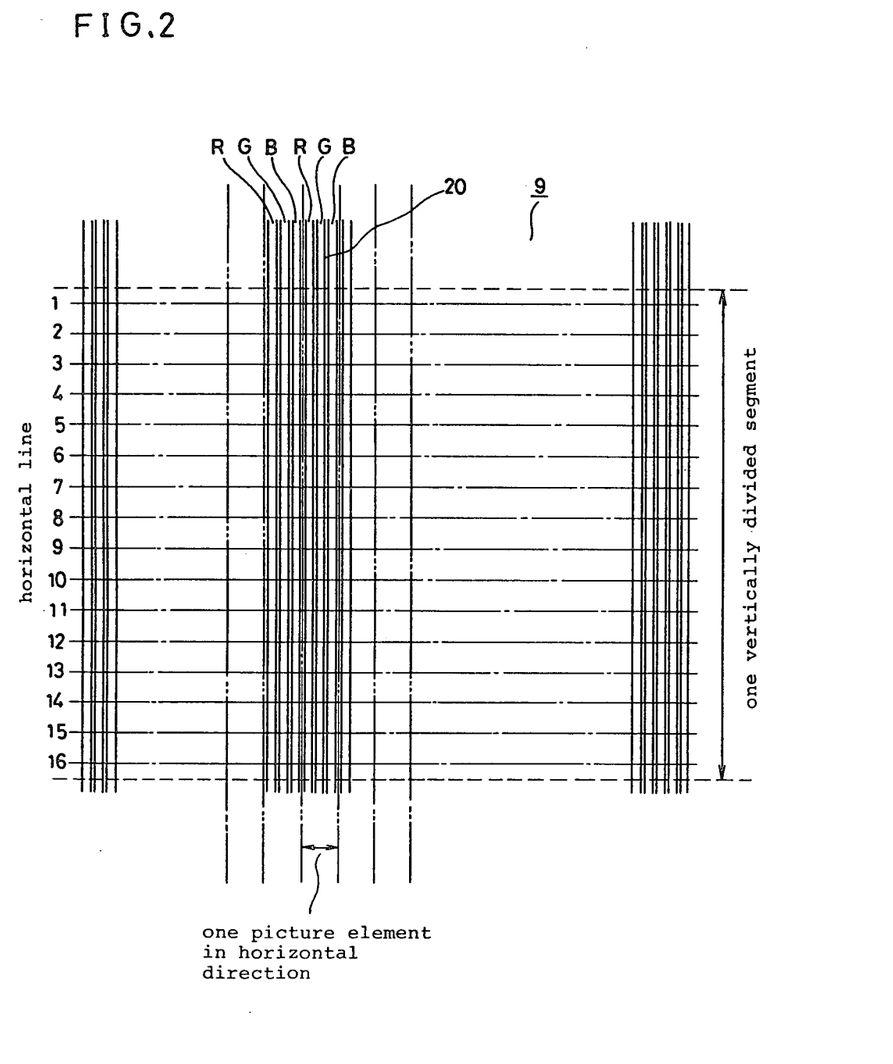
FIG. 2 is a schematic front view of a phosphor screen of the apparatus of FIG. 1.

A small segment 20, which is defined by two neighboring vertical chain lines and two neighboring horizontal broken lines, is shown enlarged in schematic view of FIG. 2, wherein the small segment 20 has 16 horizontal lines in vertical row. In an actual example, one segment has the size of 16 mm high in vertical direction and 1 mm width in horizontal direction, and in FIG. 1 the sizes are shown enlarged in widthwise direction as has been mentioned, Apart from the above-mentioned example where 320 sets of three primary color phosphor regions are formed widthwise of the phosphor screen for 320 rod shaped electron beams produced by 320 slits 14 of the beam-control electrode 5 and 320 slits 16 of the horizontal beam-focussing electrode 6, such a modification may be made that for the 320 sets of three primary color phosphor regions, 160 rod-shaped electron beams are provided, and in this case the horizontal deflection signal is 6-level changing voltage which deflects the rod-shaped electron beam to sweep for the horizontal range of the color phosphor regions of RGBRGB, and each of the beam-control electrodes 5 also receives the control signal for two picture elements in sequence.

Figure 3:
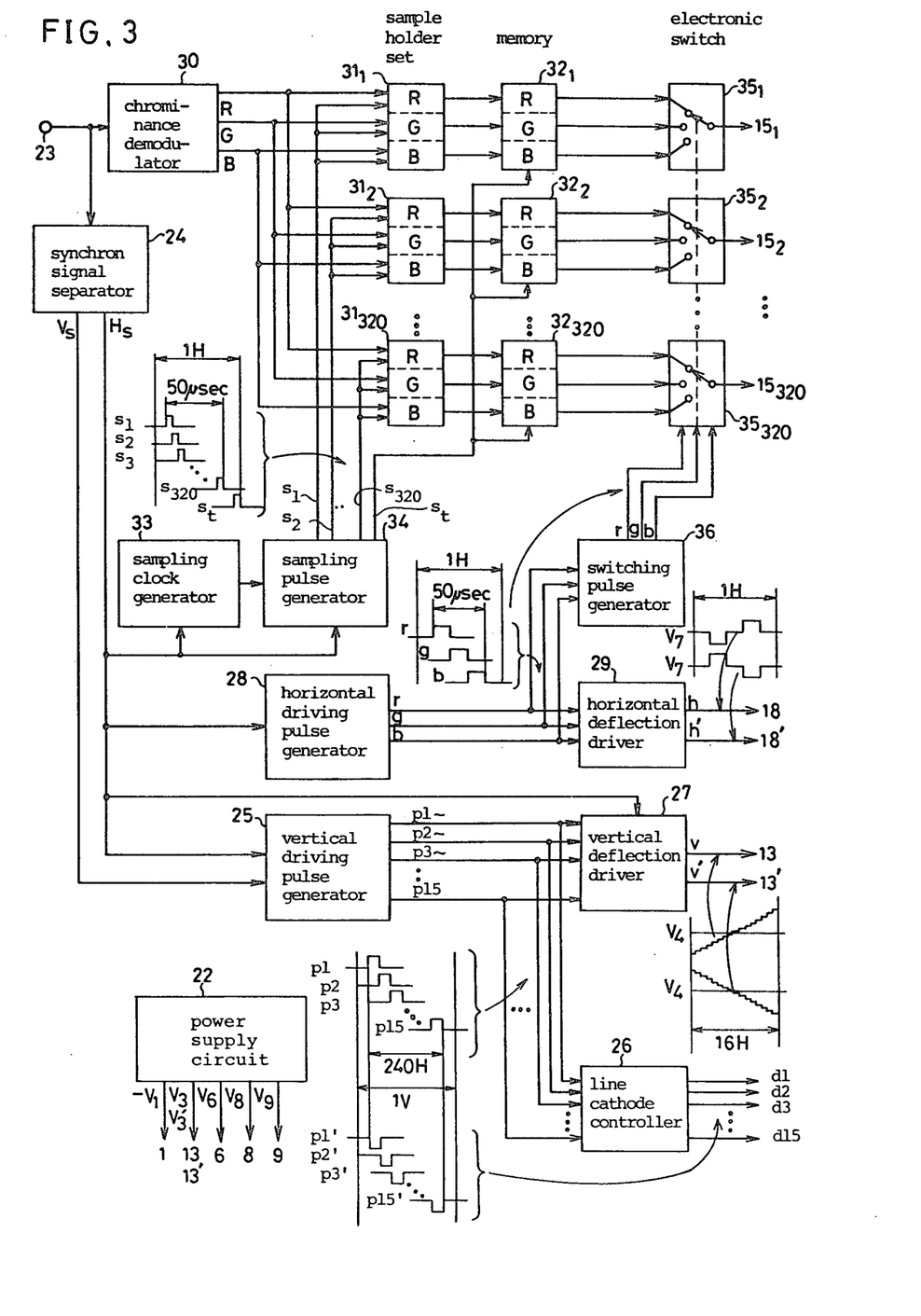
FIG. 3 is a circuit block diagram showing a fundamental electric construction which is for operating the apparatus of FIG. 1 and is, a not yet disclosed preceding stage to reach the present invention.

FIG. 3 shows a circuit block diagram of a fundamental electric construction of the apparatus of FIG. 1. The explanation starts from the part to drive the cathode ray tube to form a raster on its phosphor screen.

A power supply 22 is for impressing necessary voltages on various electrodes of the flat cathode ray tube of FIG. 1. The following DC voltages are supplied to the electrodes:

—$V_1$ to back electrode 1,
$V_3$ to vertical beam-focussing electrode 3,
$V_3'$ to vertical beam-focussing electrode 3',
$V_6$ to horizontal beam-focussing electrode 6,
$V_8$ to acceleration electrode 8,
$V_9$ to phosphor screen 9.

An input terminal 23 receives an ordinary composite video signal and give it to a synchronizing signal separator 24 and to a chrominance demodulator 30. The synchronizing signal separator 24 separates and issues vertical synchronizing signal $V_s$ and horizontal synchronizing signal $H_s$. A vertical driving pulse generator 25 comprises a counter which counts the horizontal synchronizing signal $H_s$ and is reset by the vertical synchronizing signal $V_s$, and issues 15 driving pulses p1, p2, p3 ... p15, each having duty time of 16H (1H is the time period for one horizontal scanning). The fifteen pulses p1 to p15 are issued during an effective vertical sweep period, which is the time length of one vertical sweep period exclusive of vertical fly-back time and is of 240H time length. The driving pulses are then given to the line cathode controller 26, where they are inversed of polarity to produce pulses p1', p2', p3' ... p15' falling down to 0 V at respective inversed peak period (of 16H length) and retaining 20 V for other period, and is fed to respective line cathodes 201, 202, 203 ... 215. The line cathodes are always heated by a small voltage DC current so as to be able to emit electrons at any time, and the electrons are taken out, when the pulse of a selected line cathode is at its peak (0 V), by means of positive electric field towards the vertical beam focussing electrode 3 and subsequent other electrodes. For period other than the peak (0 V) of the pulses impressed on a line cathode, because of negative electric field formed by impression of +20 V thereon, the line cathodes do not emit electron beams. That is, one of the 15 line cathodes in turn emit electrons beams. Therefore, the line cathodes are activated in turn from the top one 201 to the bottom one 215 each for 16H time period. The emitted electrons are driven forward to the vertical beam-focussing electrodes 3, 3' and focussed to form a horizontal sheet-shaped electron beam.

A vertical deflection driver 27 comprises a counter for counting horizontal synchronizing signal $H_s$ and is reset by the output pulses p1, p2 ... p15 of the vertical driving pulse generator 25 and an A/D converter for A/D converting the count output. And the vertical deflection driver 27 issues a pair of vertical deflection signals v, v', which are 16-step rising sawtooth wave and 16-step falling sawtooth wave, respectively, both having center voltage of $V_4$. These vertical deflection signals v and v' are impressed on the upper vertical deflection electrodes 13 and the lower vertical deflection electrodes, respectively. Accordingly, the sheet shaped electron beams are vertically stepwisely deflected in 16 steps and repeat the same. And therefore, a horizontal line displayed on the phosphor screen stepwisely falls from top position to bottom position in 16 steps in one vertically divided segment 221, 222 ... or 235 of FIG. 1.

Since the activation of the line cathodes is stepwisely shifted one by one downward every 16H time period, when the horizontal line on the phosphor screen comes down and arrives at the bottom of the first vertically divided segment 221, the next moving of the horizontal line on the phosphor screen starts from the top position of the second vertically divided segment 222, and the similar downward shifting of the horizontal line proceeds until the horizontal line arrives at the bottom of the 15th (lowest) vertically divided segment 235, and the horizontal line goes back to the top of the first segment 221. That is, the vertical deflection of the horizontal line continuously proceeds from the top (No. 1 horizontal line) to the bottom (No. 240, i.e., (15×16)th) of the phosphor screen 9, thereby forming a raster of 240 horizontal lines.

The sheet-shaped electron beam is then divided into 320 rod-shaped electron beams having substantially round sections when passing through the vertically oblong slits 14, 14 ... of the beam-control electrode $15_1$, $15_2$ ... and vertically oblong slits 16, 16 ... of the horizontal beam focussing electrode 6. The rod-shaped electron beams are controlled of their currents by means of voltage impressed on respective strip electrodes of the beam-control means 5, and further deflected by horizontal deflection means 7 so as to have one of three positions corresponding to R, G and B regions of the phosphor screen 9 by means of the horizontal deflection signals given by the horizontal deflection driver 29.

A horizontal driving pulse generator 28 comprises three stages of sequentially connected monostable multivibrators, the first stages of which are triggered by horizontal synchronizing signal $H_s$. And the horizontal driving pulse generator issues three pulses r, g and b of the same pulse widths. For one example, an effective horizontal scanning period of 50 μsec. is divided into 3 periods for the pulses r, g and b, accordingly, the pulses, r, g and b have 16.7 μsec. pulse width each. The horizontal driving pulses r, g and b are given to the horizontal deflection driver 29, which is switched by the horizontal driving pulses r, g and b and issues a pair of horizontal deflection signals h and h'. These horizontal deflection signals h and h' are three step rising signal and three step falling signal, respectively, and, both have the same center voltage $V_7$. These horizontal deflection signals h and h' are given to the horizontal deflection electrodes 18, 18, 18 ... and 18', 18', 18' ... disposed alternately in the horizontal deflection means 7. As a result, 320 rod-shaped electron beams are deflected at the same time to R, G or B regions on a same horizontal line of the phosphor screen.

Thus, the horizontal line on the phosphor screen at one time displays red image at the same time, at the next time green image at the same time and at the next time blue image at the same time, and at the next time the line proceeds to the next lower line whereon the same is repeated.

The beam intensity control is made as follows:

The input composite video signal received at the input terminal 23 is given to the chrominance demodulator 30 where color differential signals R-Y and B-Y are demodulated and G-Y is also produced by a known matrix circuit therein, and by processing these color differential signals with a luminance signal Y, primary color signals R, G and B are produced. The primary color signals R, G and B are given to 320 sets of sample hold means $31_1$, $31_2$ ... $31_{320}$, each comprising three sample hold circuits for R, G and B color signals. The output signals of the 960 sample hold circuits are given to 320 sets of memory means $32_1$, $32_2$ ... $32_{320}$, each comprising three memories for R, G and B color signals.

On the other hand a sampling clock generator 33 comprises PLL (phase locked loop) circuit, and issues sampling clock pulses of 6.4 MHz, which is controlled to have a predetermined phase difference against the horizontal synchronizing signal $H_s$. The sampling clock pulses are given to the sampling pulse generator 34, wherein by means of, for example, a shift register of 320 stages, 320 sampling pulses $S_1$, $S_2$ ... $S_{320}$, each having phase difference by 50 μsec/320 time inbetween, are produced and given to the sample hold circuits $31_1$, $31_2$ ... $31_{320}$, respectively. After the last sampling pulse $S_{320}$, a transferring pulse $S_t$ is issued from the sampling pulse generator 34 to the memories $32_1$, $32_2$ ... $32_{320}$. The sampling pulses $S_1$, $S_2$ ... $S_{320}$ correspond to 320 picture elements in the horizontal direction on the phosphor screen 9, and their timings are controlled so as to have a constant relation with respect to the horizontal synchronizing signal $H_s$. By impressing the 320 sets of sampling pulses to respective 320 sets of sample-hold circuits, the sample-hold circuits $31_1$, $31_2$ ... $31_{320}$ sample and hold R, G and B information of video signals therein. After finishing of the sample-hold for one horizontal line, upon receipt of the transfer signal $S_t$ by the memories, the sample-held informations are transferred at one time to the memories $32_1$, $32_2$ ... $32_{320}$, and retained there for the next one horizontal scanning period (H=63.5 μsec).

The R, G and B information of the video signal for the one horizontal line stored in the memories $32_1$, $32_2$ ... $32_{320}$ are led to 320 electronic switches $35_1$, $35_2$ ... $35_{320}$, which are electronics switches comprising analog gate circuits for selectively leading the stored signals of a color R, G or B to the respective strip electrodes $15_1$, $15_2$ ... $15_{320}$ of the beam control means 5. The switching circuits $35_1$, $35_2$ ... $35_{320}$ are simultaneously switched, being controlled by switching pulses given from a switching pulse generator 36, which is controlled by the output pulses r, g and b of the horizontal driving pulse generator 28. The electronic switches $35_1$, $35_2$ ... $35_{320}$ switch every 16.7 μsec (=50 μsec/3) for selectively leading the video signal information of R, G and B color in turn each for 16.7 μsec.

Hereupon it should be noted that timing (phases) of the switchings of the electronic switches $35_1$, $35_2$ ... $35_{320}$ and the horizontal deflection driver 29 should be completely synchronized with each other, in order to avoid poor color impurity caused by undesirable mixing of a color signal with other color signals.

As a result of the operation as has been elucidated, the phosphor screen displays red color image of one horizontal line at one time, followed by green color image of the horizontal line at one time and further followed by blue color image of the horizontal line at one time, and then the same displaying is made proceeding to the next (lower) line, and thus displaying of one field having 240 horizontal lines is completed. And the displayings of the fields are repeated and television picture is obtainable on the phosphor screen 9.

In case the number of picture elements on one horizontal line is selected twice or three times of the number of rod shape electron-beams each individually controlled by independent beam control electrodes $15_1$, $15_2$ ..., the number of the above-mentioned sample-hold circuits must be increased twice or three times of the number of the picture elements on the line, and consequently, the numbers of the memories should also be increased to the same number. And each electronic switch should selectively connect the outputs of the increased number of memories time-sharingly to the corresponding beam-control electrodes.

The primary colors of the phosphor regions are not necessarily limited to the combination of the R, G and B, but any other combination as the primary color of phosphors may be usable.

Figure 5:
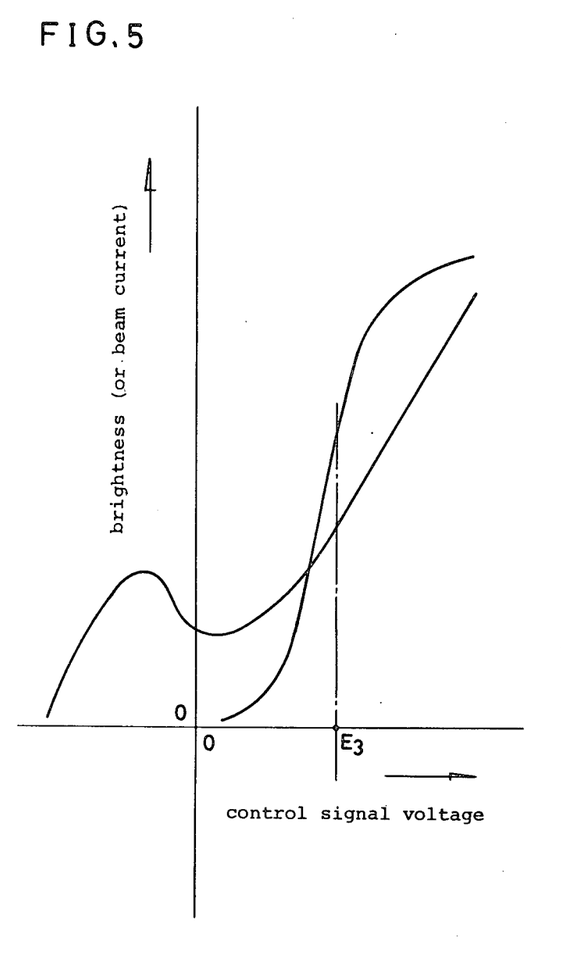
FIG. 5 is a graph showing a relation between the control signal voltage and brightness of the screen.

According to the above-mentioned display apparatus a color video display can be made. However, the apparatus has the problem that the light emission from the phosphor screen is not necessarily proportional to the input video signal, and that sizes of the beam spot on the phosphor screen are liable to be influenced by the video signal, and these problems lead to poor gradation and poor resolution of the displayed image. As the inventors experimentally confirmed, the above-mentioned problems are based on the fact that as shown in FIG. 5, the relation between the control signal voltage impressed on the beam control electrode 5 and the electron beam current does not have good linearity.

The reason of the poor linearity of the control signal vs beam current characteristic is supposed such that, when the control signal voltage is changed, the characteristics of the electrostatic lens system are also changed, resulting in deterioration of electron beam convergence condition and unexpected bombardment to various electrodes by the electron beams. That is, as a result of changes in video signal, the voltage distributions among the deflection electrodes 4, 7 or convergence electrodes 3, 3', 6 may be influenced as a result of the change of the video signal, and the condition for the electron beam convergence may be lost, thereby losing the linearity between the video signal and the brightness, and also changing the sizes of the electron beam spot, deteriorating resolution of the displayed image.

The apparatus in accordance with the present invention hereinafter elucidated referring to FIG. 6 through FIG. 10 can eliminate such problems of change of sizes of the displayed beam spots and poor linearity of the brightness to the video signal.

Figure 6:
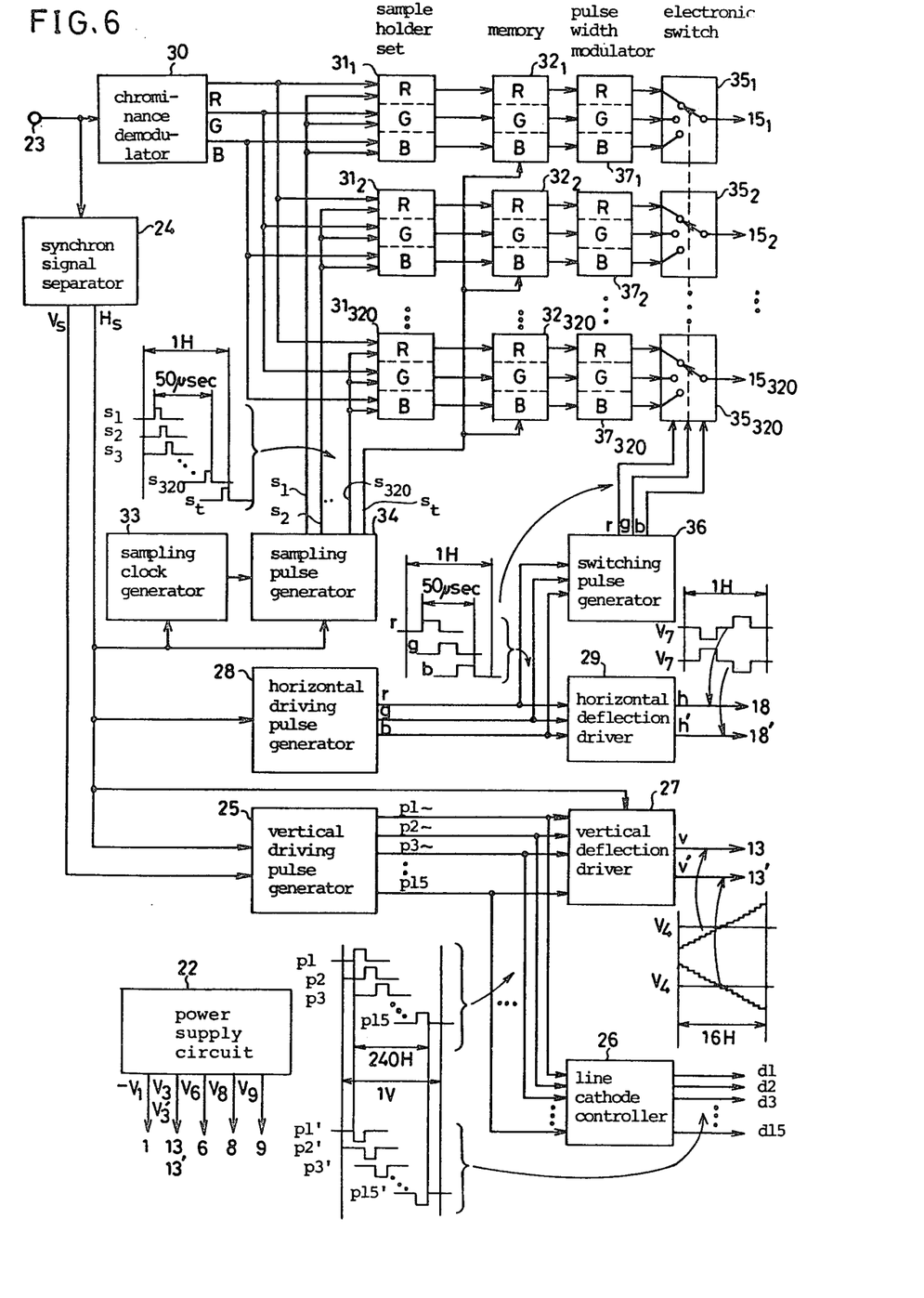
FIG. 6 is a circuit block diagram showing an improved electric construction of the apparatus of FIG. 1.

The feature of the apparatus shown by FIG. 6 and thereafter is to produce a pulse width modulation (PWM) signal based on the video signal (more particularly, for example, R, G and B signal), and impressing the PWM signal on the beam-control electrodes $15_1$, $15_2$ ....

Details of the preferred embodiment of the present invention are elucidated referring to the circuit block diagram of FIG. 6.

In the circuit of FIG. 6, most parts are constructed similarly to the circuit of FIG. 3, but a 320 set of pulse width modulators $37_1, 37_2 \ldots 37_{320}$ having sub-sections for R, G, B colors are provided between the output terminals for respective colors of the memories $32_1, 32_2 \ldots 32_{320}$ and the input terminals for respective colors of the electronic switches $35_1, 35_2 \ldots 35_{320}$.

Figure 7:
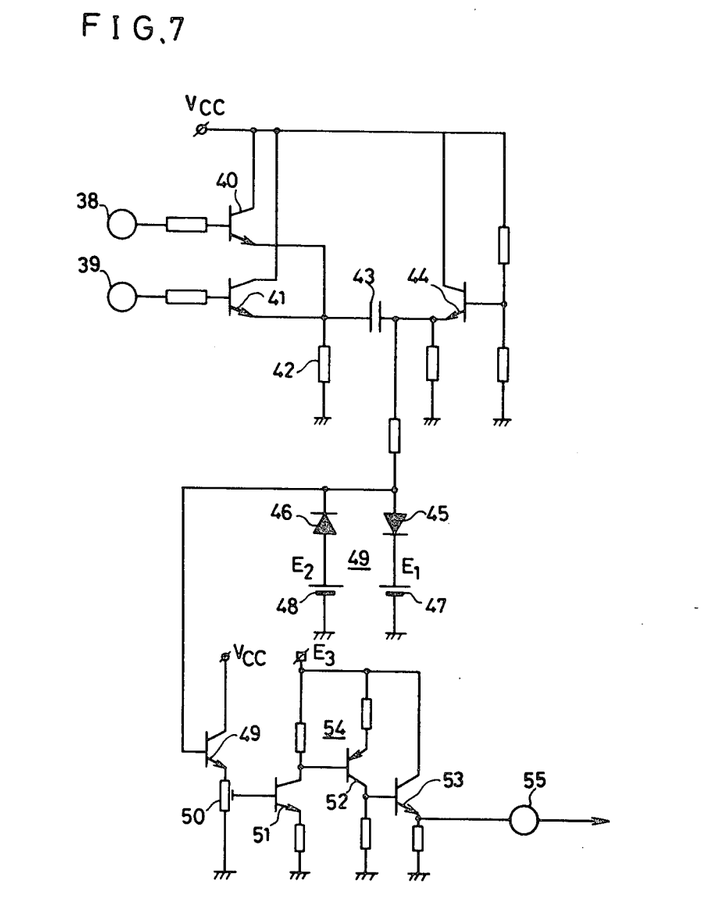
FIG. 7 is a circuit diagram of an example of pulse width modulation circuit in the circuit of FIG. 6, FIGS. 1A to 8E are waveform charts illustrating the operation of the circuit of FIG. 7.
Figure 8A:
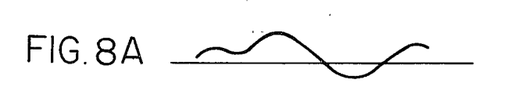
Figure 8B:
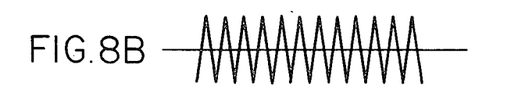
Figure 8C:
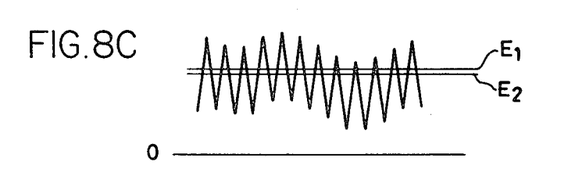
Figure 8D:
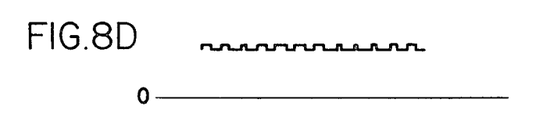
Figure 8E:
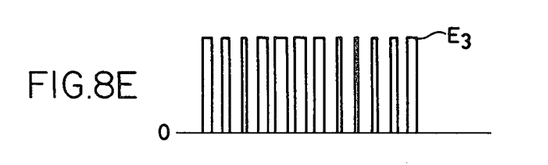

A practical example of the pulse width modulator usable for one of the pulse width modulators $37_1, 37_2 \ldots 37_{320}$ is shown in FIG. 7, and waveform for illustrating the operation of the circuit of FIG. 7 is shown in FIG. 8. In this circuit, sample hold output A shown in FIG. 8 from a memory $32_j$ (j=1, 2 ... or 320) is impressed on an input terminal 38, and a reference signal B of triangular wave or sawtooth wave is impressed on another input terminal 39. The period of the reference signal should be selected sufficiently shorter, for example from 1/100 to 1/10, than those of the horizontal driving pulses r, g and b (each 16.7 μsec). The input signals are processed (impedance conversion) by transistors 40 and 41 and synthesized on a resistor 42 to form a superposed signals of both and is put out through a capacitor 43. Receiving an appropriate bias voltage from a transistor 44, the superposed output signal is given to a clipping circuits 49 comprising a diodes 45 and 46 and voltage sources 47 and 48. The voltages $E_1$, $E_2$ of the voltage sources are selected to be appropriate values as shown in C of FIG. 8, and thereby, by the clipping action, a signal of waveform D of FIG. 8 is produced and given to the base of a transistor 49. The signal is then taken out through a potentiometer 50 and given to a switching circuit comprising transistors 51, 52 and 53, where source voltage $E_3$ is switched thereby producing pulse width modulated output signal of a constant voltage to the output terminal 55, pulse width or duty ratio thereof being modulated responding to the input video signal to the terminal 38.

By impressing such pulse width modulated signals to the electron beam control electrodes $15_1, 15_2 \ldots 15_{320}$, the rod shaped electron beams are controlled to be passed only for the time period of the respective pulse widths, and therefore the average currents of the electron beams, hence resultant light emission from the phosphor screen, can be controlled responding to the video signal. Thus by controlling the average electron beam current by the pulse width modulated signal, a color video displaying is made. Since the amplitudes or voltage $E_3$ of the control signal impressed on the electron beam control electrodes $15, 15_2 \ldots$ can be made constant regardless of the pulse width as shown by $E_3$ of FIG. 8, it can be selected at an optimum voltage for good focussing by the electrostatic lens system, so as to attain best resolution of the displayed image.

For the pulse width modulation circuits, other known circuit utilizing digital element circuits may be used.

Figure 11:
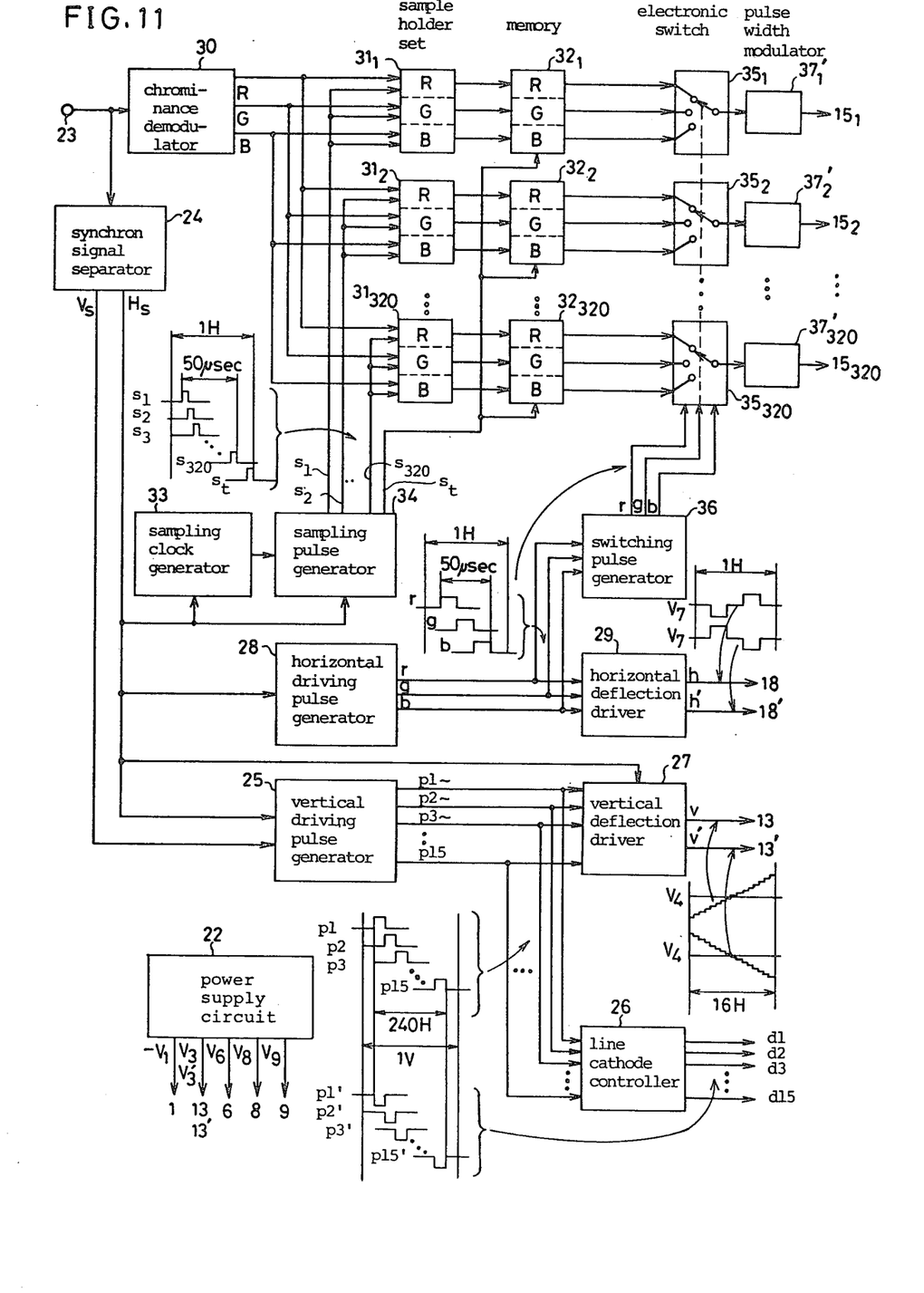
FIG. 11 is a circuit block diagram showing another improved electric construction of the apparatus of FIG. 1.

The apparatus of FIG. 6 can be modified by altering the dispositions of the pulse width modulation circuits, to the positions between the output terminals of the electronic switches $35_1, 35_2 \ldots 35_{320}$ and the electron beam controlling electrodes $15_1, 15_2 \ldots 15_{320}$ as shown by FIG. 11. In this modified construction, the number of elementary pulse width modulation circuits can be reduced to one third of the case of FIG. 6.

In color display apparatus, when nonuniformity or irregularity of finishing the R, G and B phosphor regions or emission efficiency thereof arises, or change or color temperature of room illumination around the display apparatus arises, it is necessary to re-adjust the white balance of the display apparatus.

Such adjusting of the white balance may be made by changing or adjusting the ratio of electron beam impingements for R, G and B phosphors. As one hypothetical concept for such adjusting of the electron beam amount, variable attenuators for adjusting the output signal may be provided to the output terminals of the R, G and B memories of 320 memory sets for adjusting these variable attenuators. However, to provide such a large number (960) of manually controllable attenuators is not practical in view of bulk, cost and adjusting operations.

If the voltage amplitudes of video signal for some colors are adjusted for the above white balancing, as has been mentioned in detail, such amplitude adjustment necessarily induce deterioration of resolution of the displayed image.

On the contrary, according to the inventor's experimental researches, the white balance adjusting may be satisfactorily made by controlling pulse width of the electron beam controlling signal, thereby adjusting the ratio between electron beam impingement times of three primary colors.

Figure 9:
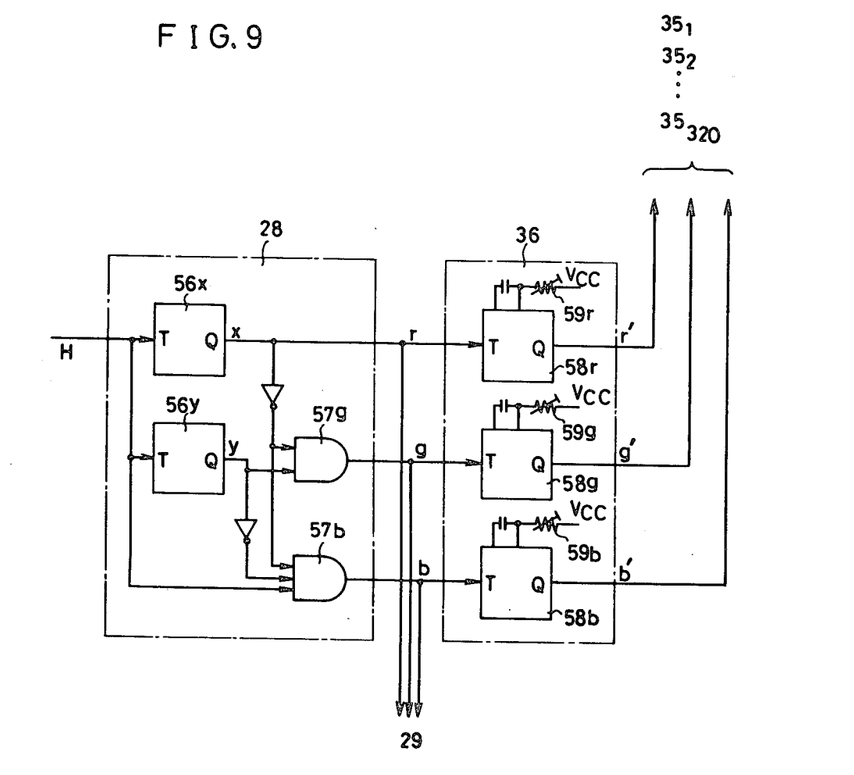
FIG. 9 is a circuit diagram of an example of white balance circuit.

FIG. 9 shows an example of a horizontal driving pulse generator 28 and a switching pulse generator 36 of FIG. 6, which enable such white balance adjusting by means of the pulse width adjustment. The horizontal driving pulse generator 28 comprises two monostable multivibrators 56x and 56y, both of which are triggered by horizontal synchronizing pulse shown by H of FIG. 10, and issues a pulse x of FIG. 10 having a pulse width of $\frac{1}{3}$ at the front part of 50 μsec horizontal scanning time, and a pulse y of FIG. 10 having a pulse width of $\frac{2}{3}$ at the rear part of the 50 μsec horizontal scanning time. The pulse x as such is used as the horizontal driving pulse r for R, and pulse g for G is made by synthesizing inverted signal of x and the pulse y in an AND gate 57g, and pulse b for B is made by synthesizing the pulse x and inverted signal of y in an AND gate 57b. These pulse signals r, g and b have the same pulse widths and are given to the horizontal deflection driver 29.

Figure 10:
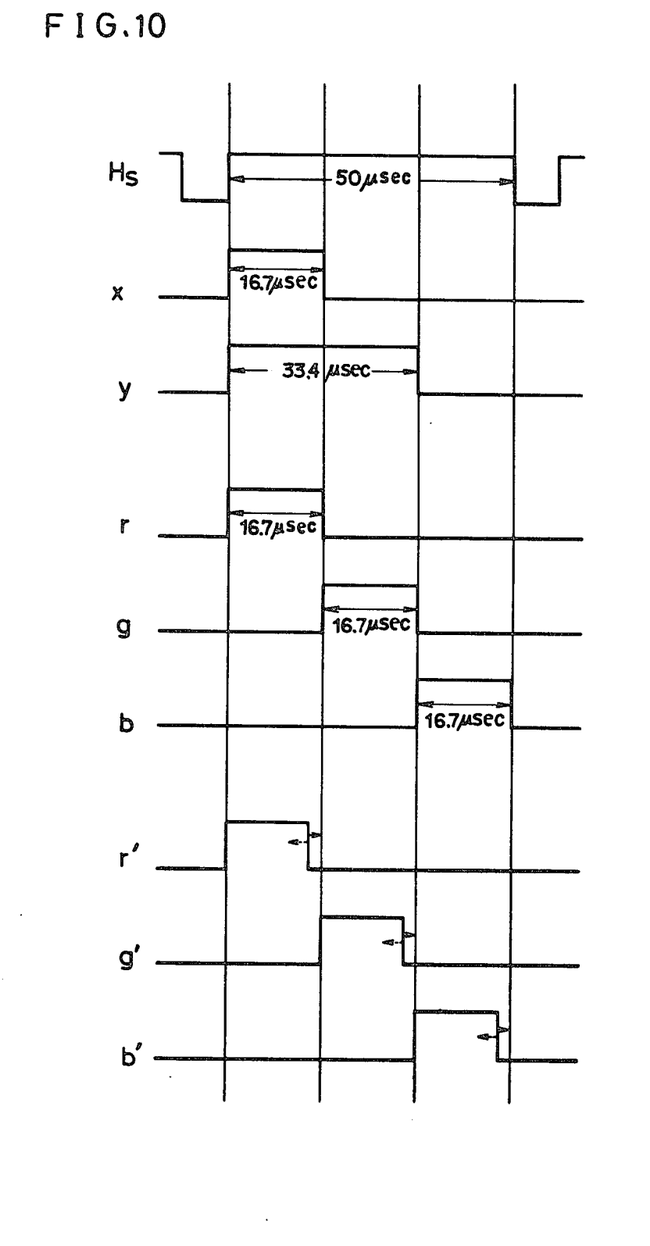
FIG. 10 is a signal waveform chart illustrating the operation of the circuit of FIG. 9.

On the other hand, in the switching pulse generator 36, three monostable multivibrators 58r, 58g and 58b are triggered by front edges of the horizontal driving pulses r, g and b, and issue the switching pulses r', g' and b' shown in FIGS. 9 and 10, respectively, which are given to the electronic switches $35_1, 35_2 \ldots 35_{320}$. The pulse widths or duty times of the output switching pulses r', g' and b' of the monostable multivibrators 58r, 58g and 58b are designed adjustable between the same pulse widths as and a little (for example 20%) shorter pulse widths than those of the horizontal driving pulses r, g and b, and can be adjusted by adjusting variable resistors 59r, 59g and 59b, which are connected between the power source and the feeding points of those monostable multivibrators 58r, 58g and 58b, respectively. Therefore, the adjustment of the white balance can be made by adjusting the pulse widths or the duty times of the switching pulses r', g' and b' by means of the variable resistors 59r, 59g and 59b, respectively. For example, the rear edges of the pulses r', g' and/or b' are adjusted as shown by r', g' and b' of FIG. 10. Thereby the ratio of the pulse widths of the switching pulses r', g' and b' are adjusted relatively, and therefore, the ratio of light emissions from R, G and B phosphors are adjusted. For example, when white balance is intended to be adjusted a little reddish, pulse width of the switching pulse r' is set to the maximum 16.7 μsec. width and the pulse widths of other switching pulses g' and b' are adjusted smaller. Adjustment to obtain other type of white balance, greenish or bluish, balance, can be made in the same way. As has been elucidated, by utilizing the circuits of FIG. 9, by adjusting only one, two or three variable resistors 59r, 59g and 59b, the white balance can be easily adjusted, and the cost and bulk of the apparatus are reasonable.

A modification of the above white balancing means may be constituted by cascade (i.e. sequence of stage) connection of three monostable multivibrators, in each of which pulse width of the output pulse is adjustable, and triggering the first monostable multivibrator by the horizontal synchronizing pulse, and taking out switching pulses r', g' and b' from output terminals Q of the monostable multivibrators. In this system, since the switching pulses r', g' and b' are generated in cascade, front edges of the switching pulses g' and b' may enter into the timing period for other pulses, for example r' and g', respectively, thereby deteriorating the color purity. In order to cope with such problem, the horizontal deflection driver 29 may be triggered by the switching pulses r', g' and b' instead of the horizontal deflection pulses r, g and b.

The above-mentioned pulse width adjusting may be made by digital method, for example using counters to produce switching pulses of desired pulse width, provided with a measure to modify its set count number.

By means of the above-mentioned pulse width modifications of the switching pulses r', g' and b, the average electron beam currents can be adjusted freely thereby enabling white balance with keeping the voltage of the electron beam control electrodes $15_1, 15_2 \ldots 15_{320}$ constant, and hence keeping the optimum condition for high resolution of the cathode ray tube.

In the above-mentioned description, the words "horizontal" and "vertical" are used to imply that "horizontal" is the direction that the lines are displayed on the phosphor screen, and "vertical" is the direction that the displayed lines is shifted to the next line to form a raster, and accordingly, these words are not bound to the absolute spatial relation of the screen.

The primary colors of the phosphor regions are not necessarily limited to the combination of the R, G and B, but any other combination as the primary color of phosphors may be useable.

What is claimed is:

1. A video image display apparatus comprising:
   an electron beam source for emitting at least an electron beam,
   a phosphor screen having a phosphor layer which emits light at impingement by said electron beams,
   an electron beam convergence means for converging said electron beam in a manner that said electron beam is impinged on said phosphor screen forming a little spot,
   an electrostatic deflection means for deflecting said electron beam prior to impingement on said phosphor screen,
   an electron beam controlling means for controlling intensity of said electron beam thereby to control light emission from said phorphor screen,
   said electron beam source being for emitting a predetermined number of horizontal rows of electron beams, for impinging corresponding vertically divided segments of said phorphor screen, and
   said electrostatic deflection means being for at least vertical deflecting said electron beams thereby to display horizontal lines of a plural number in each vertically divided segment,
   said electron beam source being for emitting a plural number of electron beams, simultaneously in a line at a time emission, which are disposed horizontally and
   said each simultaneously emitted horizontal electron beams being deflected horizontally and vertically,
   characterized in that a signal supplying means for supplying a signal for controlling said intensity of said electron beam to said electron beam controlling means,
   said signal supplying means comprises a pulse width modulation circuit which supplies a pulse signal, the width of which is modulated responding to a video signal information to be displayed, as said signal for controlling said intensity.

2. A video image display apparatus in accordance with claim 1, wherein
   said phosphor screen comprises a first predetermined number of horizontally divided sections each further having horizontally sub-divided regions of red phosphor, green phosphor and blue phosphor,
   said electron beam source is for emitting a second predetermined number of horizontal rows of electron beams, each row having said first predetermined number of electron beams corresponding to said horizontally divided sections,
   said electrostatic deflection means is for horizontally deflecting said electron beams thereby making said electron beams in turn impinge red phosphor regions, green phosphor regions and blue phosphor regions, to displaying red, green and blue horizontal lines in turn.

3. A video image display apparatus in accordance with claim 2, which has
   a composite circuit for producing said control signal, said composite circuit sampling chrominance signals for respective picture elements of said first predetermined number, holding the sampled signals, issuing pulse width modulated signals based on said sample-held signals and synchronizingly feeding the pulse width modulated signals to said controlling means.

4. A video image display apparatus in accordance with claim 3, wherein
   said composite circuit comprises sample hold circuits for sampling chrominance signals, for respective picture elements of said first predetermined number, and holding the sampled signals,
   memory circuits for storing sample-held signals,
   pulse width modulators for producing pulse width signals based on the outputs of said memory circuits, and
   electronic switches for synchronizingly feeding said pulse width modulated signals for respective chrominance signals to corresponding electron beam control electrodes of said electron beam controlling means.

5. A video image display apparatus in accordance with claim 3, wherein said composite circuit comprises
   sample hold circuits for sampling chrominance signals, for respective picture elements of said first predetermined number, and holding the sampled signals, memory circuits for storing said respective sample-held signals, electronic switches for synchronizingly taking out outputs of memory circuits for respective chrominance signals, and pulse width modulators for producing pulse width modulated signals based on the outputs of said electronic switches and issuing outputs thereof to corresponding electron beam control electrodes of said electron beam controlling means.

6. A video image display apparatus in accordance with claim 4 or 5, wherein white balance is adjusted by means of adjustment of the ratio of time distribution of gate on time and gate off time in said electronic switch.

7. A video image display apparatus in accordance with claim 3, which comprises digital memories for storing digital signals which represent sample-held chrominance signals as digital-code signals.

8. A video image display apparatus in accordance with claim 2, further comprising an adjusting means for a ratio of duty time of electron beam impingements of respective color phosphor for adjusting white balance of the image.

* * * * *